United States Patent
Tseng et al.

(10) Patent No.: US 12,528,690 B2
(45) Date of Patent: Jan. 20, 2026

(54) LIQUID DISTRIBUTION MODULE

(71) Applicant: Lite-On Technology Corporation, Taipei (TW)

(72) Inventors: Pin Ying Tseng, Taipei (TW); Shu-Hua Mau, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 141 days.

(21) Appl. No.: 18/582,691

(22) Filed: Feb. 21, 2024

(65) Prior Publication Data

US 2025/0100867 A1    Mar. 27, 2025

Related U.S. Application Data

(60) Provisional application No. 63/540,109, filed on Sep. 25, 2023.

(30) Foreign Application Priority Data

Jan. 23, 2024  (CN) .......................... 202410091286.2

(51) Int. Cl.
*B67D 3/00* (2006.01)
*G06F 1/20* (2006.01)
*H05K 7/20* (2006.01)

(52) U.S. Cl.
CPC ........... *B67D 3/008* (2013.01); *B67D 3/0009* (2013.01); *G06F 1/20* (2013.01); *H05K 7/20218* (2013.01); *H05K 7/20272* (2013.01); *H05K 7/20281* (2013.01); *B67D 2210/00034* (2013.01)

(58) Field of Classification Search
CPC .................. B67D 3/008; B67D 3/0009; B67D 2210/00034; H05K 7/20218; H05K 7/20272; H05K 7/20281; G06F 1/20
See application file for complete search history.

(56) References Cited

U.S. PATENT DOCUMENTS

2025/0098113 A1 * 3/2025 Wang ................. H05K 7/20781

FOREIGN PATENT DOCUMENTS

| TW | M632001 |   | 9/2022 |   |
|----|---------|---|--------|---|
| TW | M632001 U | * | 9/2022 |   |
| TW | 869177 B1 | * | 1/2025 | ............... H05K 7/20 |
| WO | 2018069635 |   | 4/2018 |   |

OTHER PUBLICATIONS

"Office Action of Taiwan Counterpart Application", issued on Aug. 23, 2024, p. 1-p. 10.

* cited by examiner

*Primary Examiner* — Frederick C Nicolas
(74) *Attorney, Agent, or Firm* — JCIPRNET

(57) ABSTRACT

A liquid distribution module includes a housing, a first connecting portion, at least one liquid driving unit and at least one handle assembly. The first connecting portion is disposed in the housing. The fluid driving unit is adapted to be arranged in the housing and includes a second connecting portion. The handle assembly is pivotally connected to the fluid driving unit and adapted to drive the fluid driving unit by force to switch between a free state and a fixing state. When the fluid driving unit is in the free state, the handle assembly is adapted to drive the fluid driving unit to slide relative to the housing. When the fluid driving unit is in the fixing state, the fluid driving unit is fixed in the housing so that the second connecting portion is docked with the first connecting portion.

20 Claims, 16 Drawing Sheets

LIQUID DISTRIBUTION MODULE

CROSS-REFERENCE TO RELATED APPLICATION

This application claims the priority benefit of U.S. provisional application Ser. No. 63/540,109, filed on Sep. 25, 2023, and China application serial no. 202410091286.2, filed on Jan. 23, 2024. The entirety of each of the above-mentioned patent applications is hereby incorporated by reference herein and made a part of this specification.

BACKGROUND

Technical Field

The disclosure relates to a fluid distribution module, and particularly relates to a fluid distribution module with handle assemblies.

Description of Related Art

Generally, a liquid-cooling system achieves heat exchange for heating elements, such as servers, by circulating the coolant, so as to reduce the temperature of each heating element. Some liquid-cooling systems have a coolant distribution unit (CDU), which may regulate and distribute the coolant with different flow rates to individual heating elements to provide better efficiency and precision for cooling. However, the assembly process for conventional coolant distribution units is laborious and complex, which consequentially causes both user inconvenience and impediments to timely replacement and maintenance.

SUMMARY

The disclosure provides a fluid distribution module whose assembly process is simple and labor-saving.

A fluid distribution module of the disclosure includes a housing, a first connecting portion, at least one fluid driving unit and at least one handle assembly. The first connecting portion is disposed in the housing. The fluid driving unit is adapted to be arranged in the housing and includes a second connecting portion. The handle assembly is pivotally connected to the fluid driving unit and is adapted to drive the fluid driving unit by force to switch between a free state and a fixing state. When the fluid driving unit is in the free state, the handle assembly is adapted to drive the fluid driving unit to slide relative to the housing. When the fluid driving unit is in the fixing state, the fluid driving unit is fixed in the housing so that the second connecting portion is docked with the first connecting portion.

In an embodiment of the disclosure, the handle assembly includes a connecting element and a holding element. The connecting element is pivotally connected to the fluid driving unit. The holding element is pivotally connected to the connecting element.

In an embodiment of the disclosure, the second connecting portion includes two second connecting ends. The first connecting portion includes at least two first connecting ends. When the fluid driving unit is in the fixing state, the two second connecting ends are respectively connected to the at least two first connecting ends.

In an embodiment of the disclosure, the connecting element includes a first end and a second end opposite to each other. The first end is pivotally connected to the holding element. The second end has a hook. The hook corresponds to a force-receiving portion of the housing.

In an embodiment of the disclosure, the connecting element is pivotally connected to the fluid driving unit through a pivot. The pivot is adjacent to the second end and is distant from the first end.

In an embodiment of the disclosure, when the fluid driving unit is in the free state, the second end is adapted to abut against the fluid driving unit.

In an embodiment of the disclosure, when at least a part of the fluid driving unit enters the housing, the holding element is adapted to drive the connecting element to rotate so that the hook abuts against the force-receiving portion. The holding element is adapted to drive the connecting element to further rotate, so as to slide the second end relative to the force-receiving portion to push the fluid driving unit entirely into the housing.

In an embodiment of the disclosure, when the fluid driving unit is in the free state, the connecting element does not overlap with the force-receiving portion in a sliding direction.

In an embodiment of the disclosure, the fluid driving unit further includes a front panel. The connecting element is pivotally connected to the front panel. The front panel has a receiving groove.

In an embodiment of the disclosure, when the fluid driving unit is in the fixing state, the connecting element is received in the receiving groove.

In an embodiment of the disclosure, the fluid distribution module further includes at least one hand screw. The at least one hand screw is disposed on the connecting element. When the connecting element is received in the receiving groove, the connecting element is adapted to be locked to the front panel through the at least one hand screw.

In an embodiment of the disclosure, the fluid distribution module further includes two spring pieces. The two spring pieces are respectively disposed on two sides of the front panel. The connecting element includes two engaging grooves. The two engaging grooves are adapted to respectively engage with the two spring pieces, so as to fix the fluid driving unit to the housing.

In an embodiment of the disclosure, each of the two spring pieces has a fixing section and an elastic section. The fixing section is fixed on the front panel. The corresponding engaging groove is engaged with the elastic section.

In an embodiment of the disclosure, the holding element is adapted to drive the corresponding engaging groove of the connecting element to disengage from the elastic section, so that the fluid driving unit is switched from the fixing state to the free state.

In an embodiment of the disclosure, the handle assembly further includes at least one knob assembly. The connecting element has at least one recess. The at least one knob assembly is disposed in the at least one recess. The holding element is pivotally connected to the connecting element through the at least one knob assembly.

In an embodiment of the disclosure, the at least one knob assembly includes a pressing element, a positioning element and an elastic element. The pressing element protrudes out of the connecting element and is connected to the positioning element. The positioning element has a positioning protrusion at one end away from the pressing element. The elastic element is arranged between the pressing element and the positioning protrusion.

In an embodiment of the disclosure, wherein the holding element has a first positioning groove. The connecting element has a second positioning groove. The second positioning groove is located in the at least one recess and is aligned with the first positioning groove. The positioning protrusion is positioned in the first the positioning groove and in the second positioning groove.

In an embodiment of the disclosure, the pressing element is adapted to be pressed to resist an elastic force of the elastic element to move the positioning protrusion out of the second positioning groove and the first positioning groove, and then the holding element is adapted to be rotated about the positioning element as an axis of rotation relative to the connecting element rotates so that the positioning protrusion is misaligned with the first positioning groove and is stopped by a wall surface of the holding element.

In an embodiment of the disclosure, when the holding element is rotated by a preset angle relative to the connecting element, the positioning protrusion is aligned with the first positioning groove, and the positioning protrusion retracts into the first positioning groove and the second positioning groove by the elastic force of the elastic element.

In an embodiment of the disclosure, the first positioning groove and the second positioning groove are cross-shaped.

In an embodiment of the disclosure, the at least one fluid driving unit includes two fluid driving units. The at least one handle assembly includes two handle assemblies. The two handle assemblies are pivotally connected to the two fluid driving units, respectively.

In summary, in the fluid distribution module of the disclosure, the handle assembly is pivotally connected to the fluid driving unit and is adapted to drive the fluid driving unit by force to switch between the free state and the fixing state. When the fluid driving unit is in the free state, the fluid driving unit may slide relative to the housing, and thus the user is able to easily remove and replace the fluid driving unit, thereby achieving timely replacement and repair for the fluid driving unit. When the fluid driving unit is in the fixing state, the fluid driving unit is fixed in the housing, and the second connecting portion is docked with the first connecting portion. At the moment, the coolant may flow in and out of the fluid driving unit for normal operation of the fluid distribution module. In addition, since the handle assembly provides a longer force arm, the user is able to push or pull the fluid driving unit with less force, making the replacement or assembly of the fluid driving unit very labor-saving.

DESCRIPTION OF THE EMBODIMENTS

Figure 1:
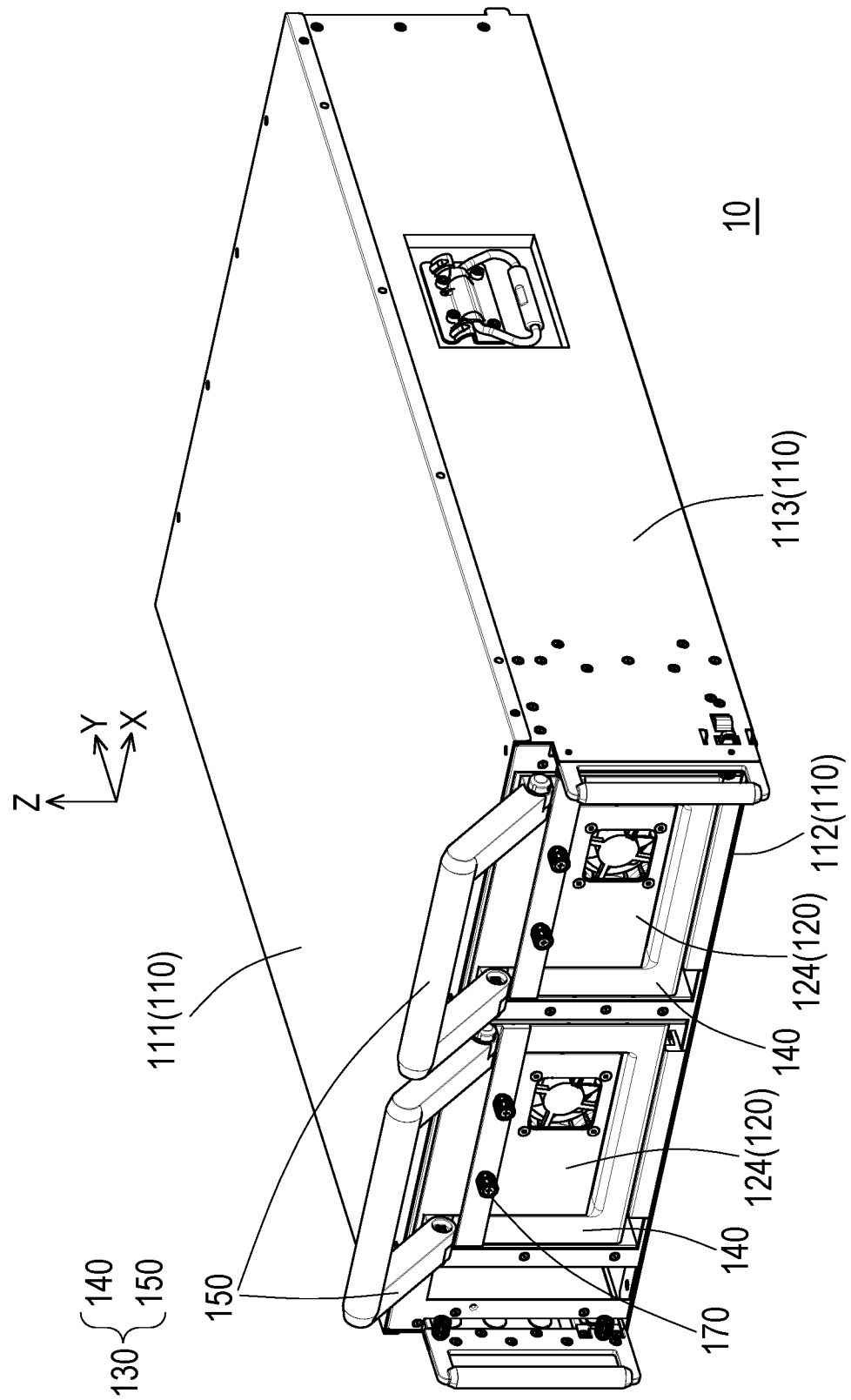
FIG. 1 is a schematic diagram of a fluid distribution module according to an embodiment of the disclosure.

Reference will now be made in detail to the exemplary embodiments of the disclosure, examples of which are illustrated in the accompanying drawings. Wherever possible, the same reference numerals are used in the drawings and descriptions to refer to the same or like parts.

Figure 2A:
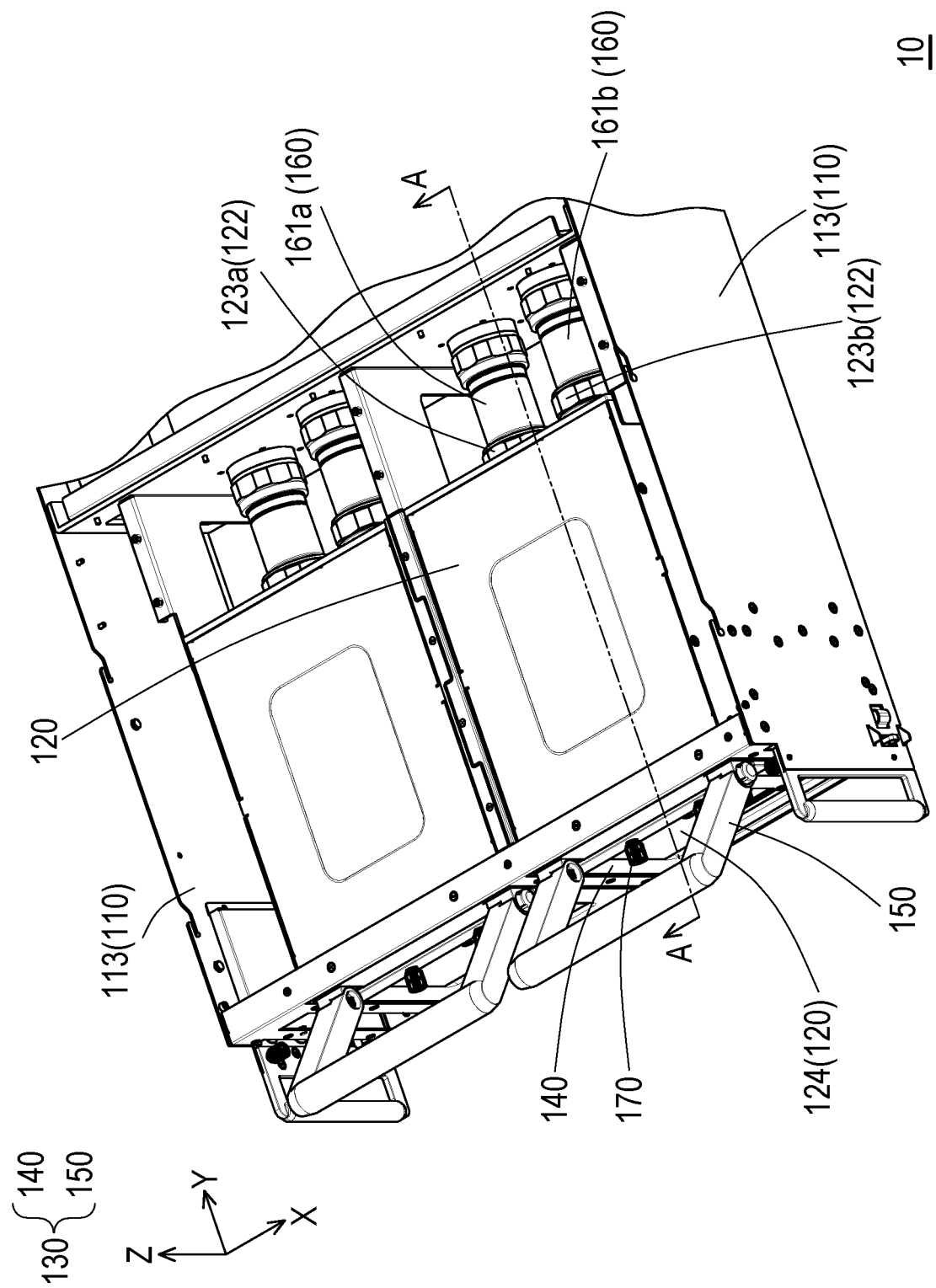
FIG. 2A is a partial enlarged view of the fluid distribution module of FIG. 1 from another angle of view.
Figure 2B:
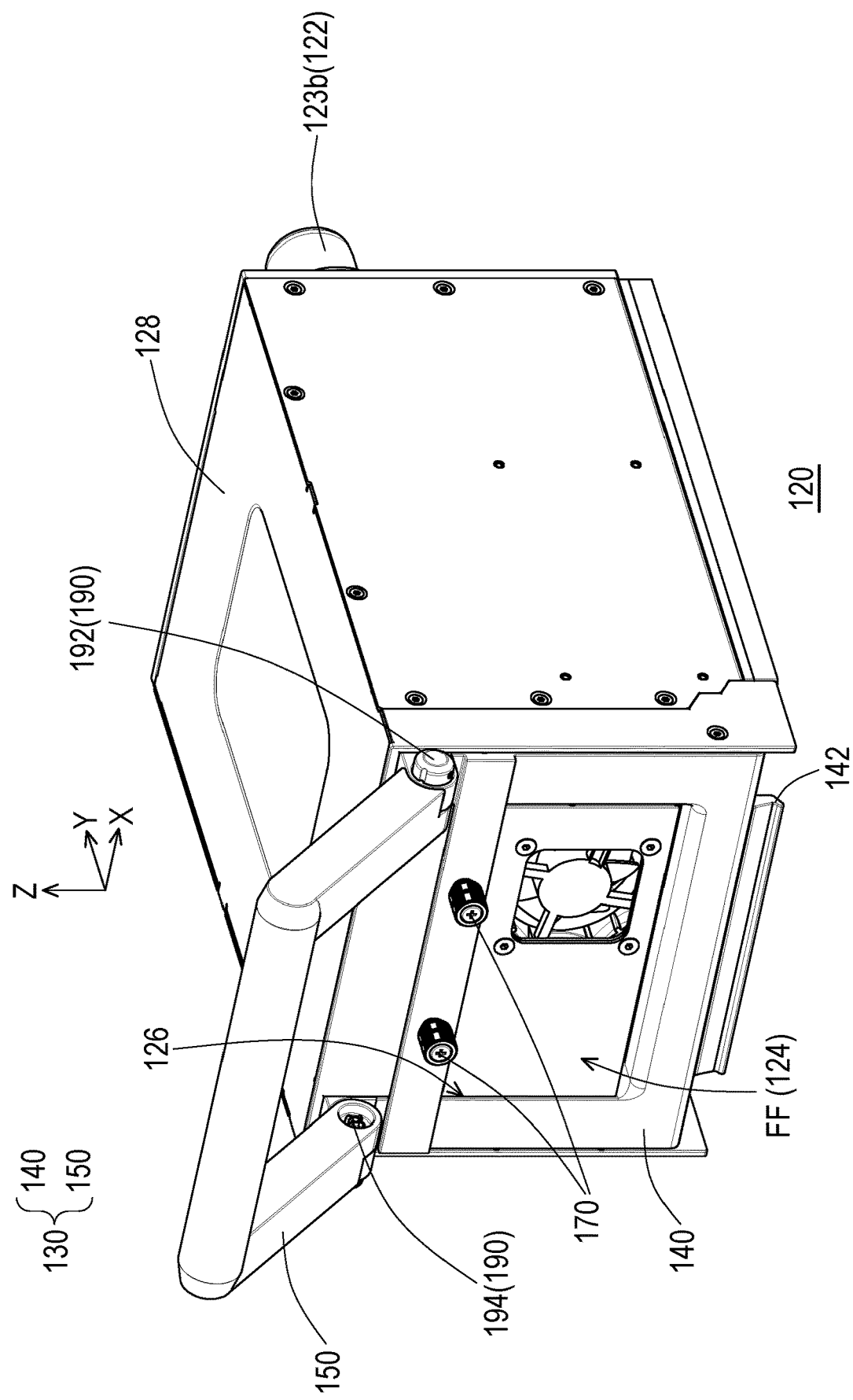
FIG. 2B is a schematic diagram of a fluid driving unit of FIG. 1.

FIG. 1 is a schematic diagram of a fluid distribution module according to an embodiment of the disclosure. FIG. 2A is a partial enlarged view of the fluid distribution module of FIG. 1 from another angle of view. FIG. 2B is a schematic diagram of a fluid driving unit of FIG. 1. In order to clearly illustrate the inside of the fluid distribution module, the top cover 111 is hidden in FIG. 2A. Referring to FIG. 1 to FIG. 2B, a fluid distribution module 10 in this embodiment is, for example, a coolant distribution unit (CDU) of a liquid cooling system, which may be connected to the circulation flow path in the system to regulate and distribute the flow of coolant, so as to dissipate heat effectively, but the application of the fluid distribution module 10 is not limited thereto.

The fluid distribution module 10 includes a housing 110, a first connecting portion 160 (FIG. 2A), at least one fluid driving unit 120 and at least one handle assembly 130. The housing 110 includes a top cover 111, a bottom portion 112 and a plurality of side plates 113, and the first connecting portion 160 is disposed in the housing 110. The fluid driving unit 120 is adapted to be arranged in the housing 110 and is located between the top cover 111 and the bottom portion 112, and includes a second connecting portion 122 (FIG. 2A). The handle assembly 130 includes a connecting element 140 and a holding element 150. The connecting element 140 is pivotally connected to the fluid driving unit 120.

In the embodiment, the at least one fluid driving unit 120 includes two fluid driving units 120. The at least one handle assembly 130 includes two handle assemblies 130, and the two handle assemblies 130 are pivotally connected to the two fluid driving units 120, respectively. When one of the two fluid driving units 120 fails to work, the other of the two fluid driving units 120, as a backup unit, may start operating in a timely manner. Then the failed fluid driving unit 120 may be quickly replaced through the design introduced later, without shutting down the entire cooling system for repair.

Figure 3:
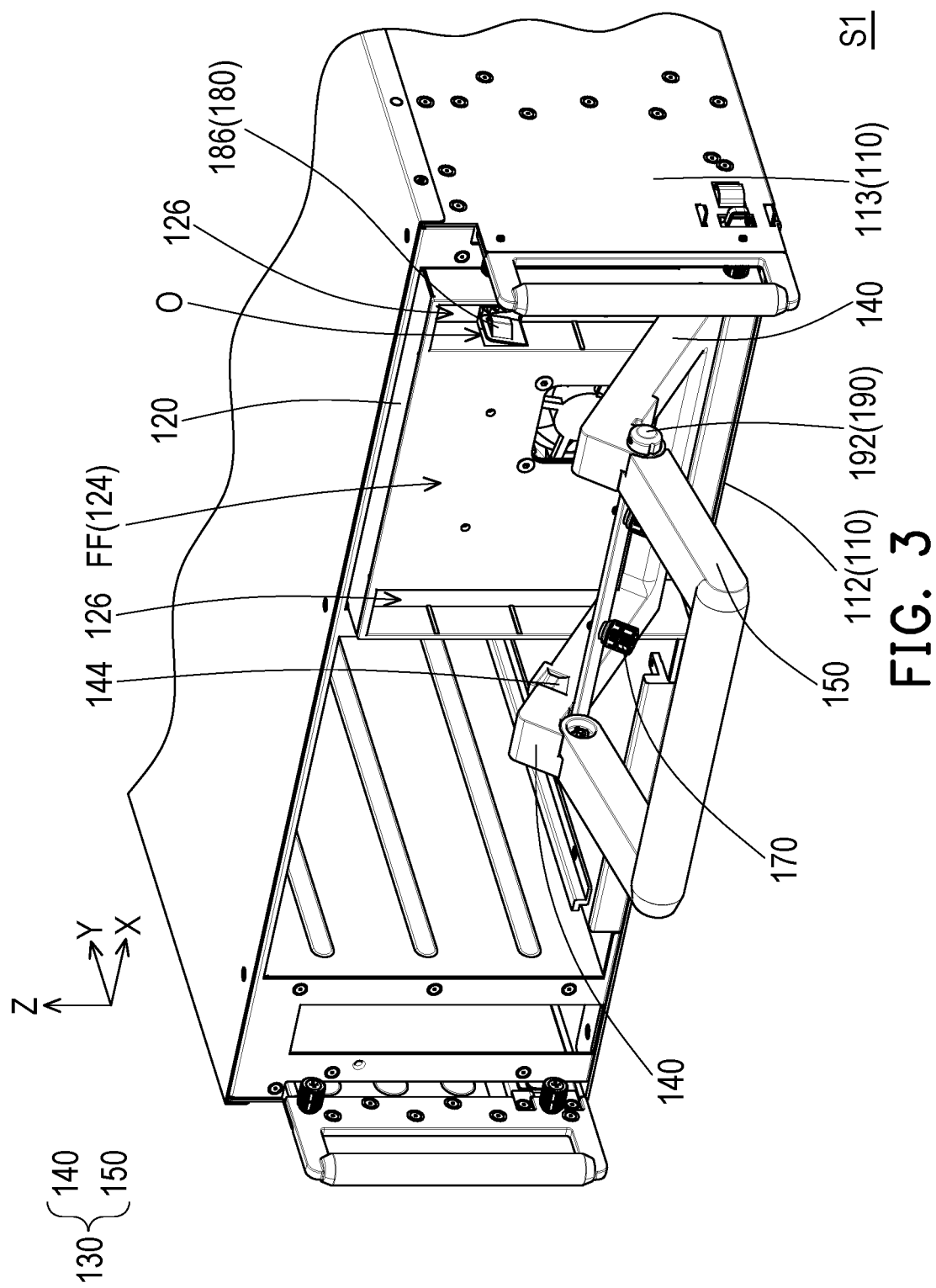
FIG. 3 is a partial enlarged view of the fluid distribution module of FIG. 1 in a free state.
Figure 4A:
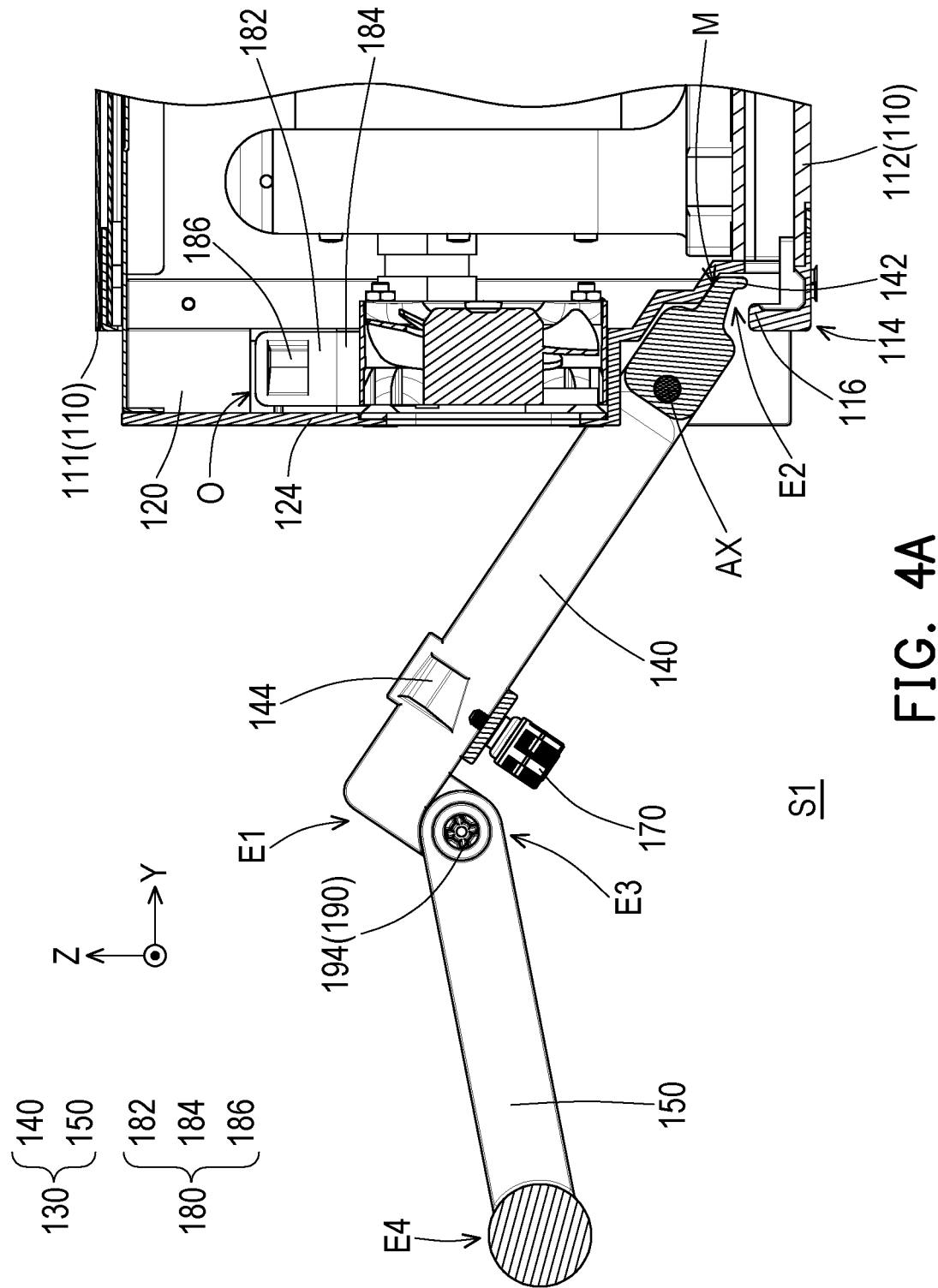
FIG. 4A is a partial cross-sectional view of the fluid distribution module of FIG. 1 along line A-A in the free state.
Figure 4B:
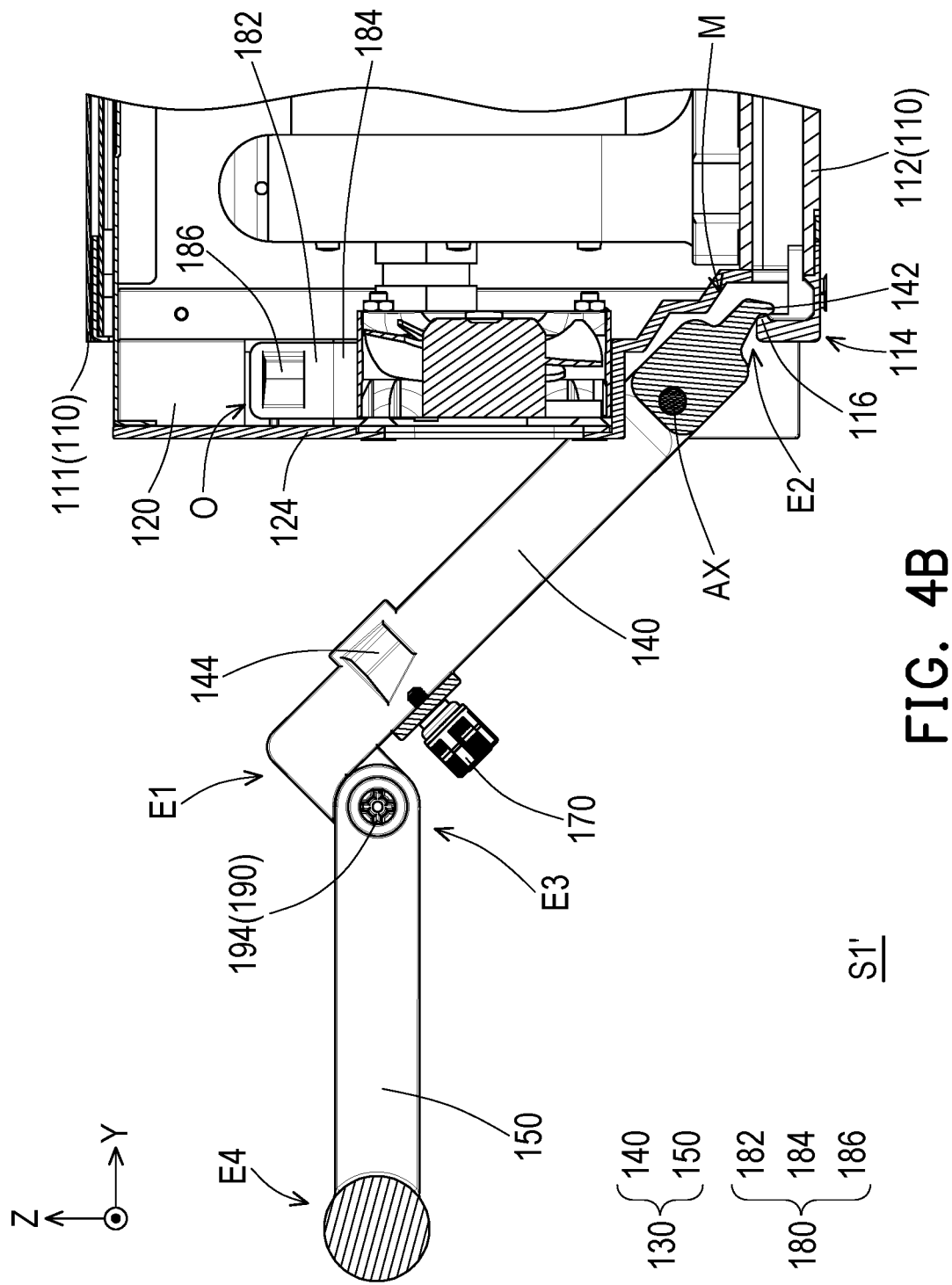
FIG. 4B is a partial cross-sectional view of the fluid distribution module of FIG. 1 along line A-A in another free state.
Figure 4C:
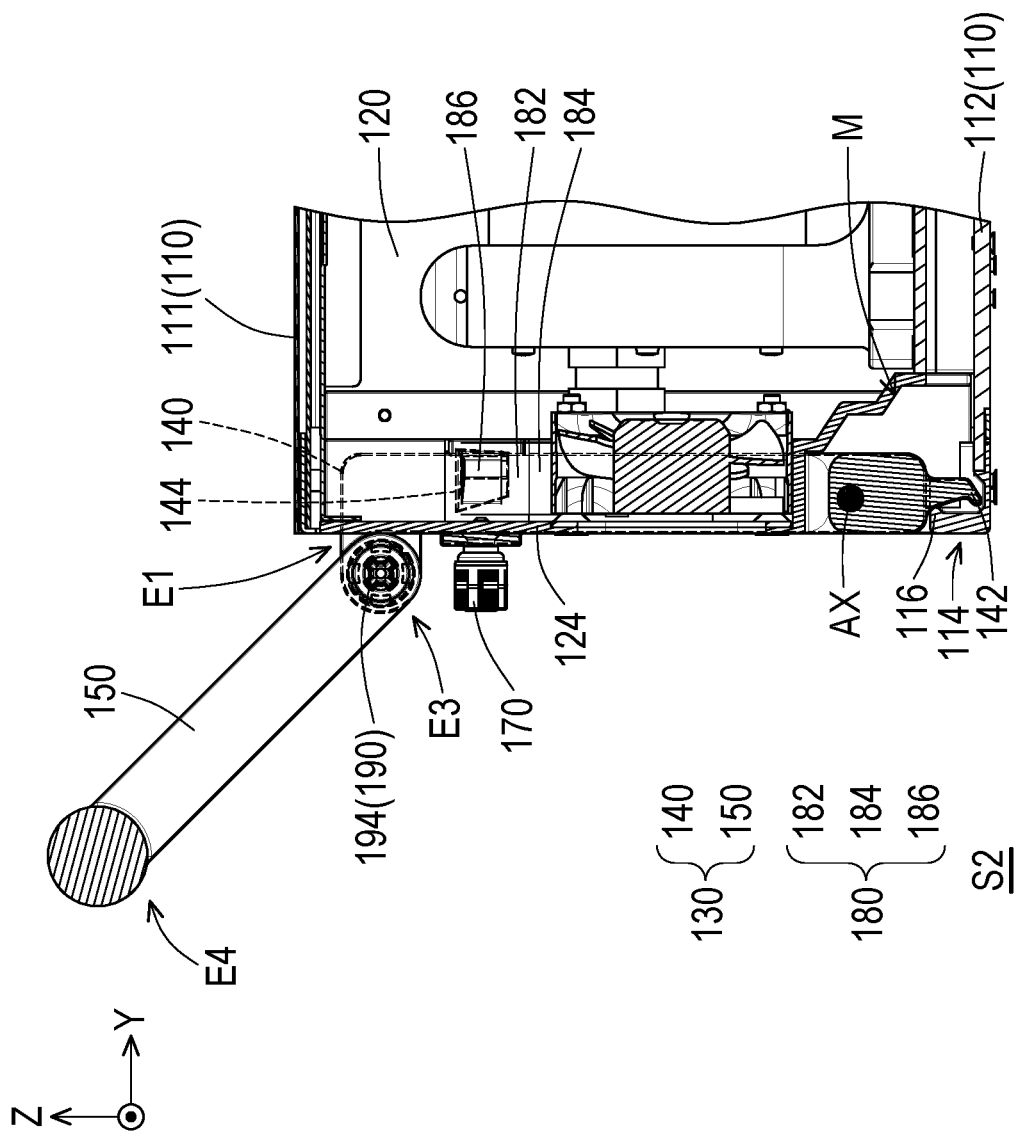
FIG. 4C is a partial cross-sectional view of the fluid distribution module of FIG. 1 along line AA in a fixing state.

FIG. 3 is a partial enlarged view of the fluid distribution module of FIG. 1 in a free state. FIG. 4A is a partial cross-sectional view of the fluid distribution module of FIG. 1 along line A-A in the free state. FIG. 4B is a partial cross-sectional view of the fluid distribution module of FIG. 1 along line A-A in another free state. FIG. 4C is a partial cross-sectional view of the fluid distribution module of FIG. 1 along line AA in a fixing state.

It should be noted that a free state S1 of the fluid driving unit 120 in FIG. 4A corresponds to the state of the fluid driving unit 120 in FIG. 3. A fixing state S2 of the fluid driving unit 120 in FIG. 4C corresponds to the state of the fluid driving units 120 in FIG. 1 and FIG. 2A. Moreover, in order to clearly illustrate a single fluid driving unit 120, the other of the fluid driving units 120 on the left is hidden in FIG. 3. In addition, only one fluid driving unit 120 is shown and side plates 113 are hidden in FIG. 4A to FIG. 4C.

Referring to FIG. 3, FIG. 4A and FIG. 4C, the holding element 150 in this embodiment is pivotally connected to the connecting element 140 and is adapted to drive the fluid driving unit 120 to switch between the free state S1 and the fixing state S2 (FIG. 4C). When the fluid driving unit 120 fails to work and needs to be replaced, the fluid driving unit 120 may be switched to the free state S1. The handle assembly 130 is adapted to drive the fluid driving unit 120 to slide relative to the housing 110 in a sliding direction (i.e., the Y-axis direction), so that the user is able to easily remove and replace the fluid driving unit 120, thereby achieving timely replacement and repair for the fluid driving unit 120.

Referring to FIG. 2A and FIG. 4C, when the fluid driving unit 120 is arranged in the housing 110, the fluid driving unit 120 may be switched to the fixing state S2 (FIG. 4C) and fixed in the housing 110, so that the second connecting portion 122 is docked with first connecting portion 160.

In this embodiment, the first connecting portion 160 includes at least two first connecting ends 161a and 161b, such as a liquid outlet and a liquid inlet of the circulation flow path in the cooling system. The second connecting portion 122 includes two second connecting ends 123a and 123b, such as an inlet which allows the coolant to flow in and an outlet through which allows the coolant to flow out of the fluid driving unit 120. When the fluid driving unit 120 is in the fixing state S2, the two second connecting ends 123a and 123b are respectively connected to the at least two first connecting ends 161a and 161b, the coolant in the cooling system may enter and exit the fluid driving unit 120, and the fluid driving unit 120 may start normal operation.

The replacement of the fluid distribution module 10 will be explained in more detail below. Referring to FIG. 4A to FIG. 4C, the connecting element 140 in this embodiment includes a first end E1 and a second end E2 opposite to each other. The holding element 150 includes a third end E3 and a fourth end E4 opposite to each other. The fourth end E4 is, for example, a handle to which the user may hold and apply force. The bottom portion 112 of the housing 110 is provided with a force-receiving portion 114. The force-receiving portion 114 extends toward the connecting element 140 (i.e., the Z-axis direction) and has a protruding portion 116.

The first end E1 is pivotally connected to the third end E3 of the holding element 150. The second end E2 has a hook 142, and the hook 142 corresponds to the force-receiving portion 114 of the housing 110. In addition, the fluid driving unit 120 further includes a front panel 124. The connecting element 140 is pivotally connected to the front panel 124 of the fluid driving unit 120 through a pivot AX, which is adjacent to the second end E2 and is distant from the first end E1.

First, as illustrated in FIG. 4A, when the fluid driving unit 120 is in the free state S1, the user may apply force to the fourth end E4 of the holding element 150, so that the connecting element 140 connected to the holding element 150 is rotated about the pivot AX as a center of rotation (i.e., in the counterclockwise direction in FIG. 4A), and then the second end E2 abuts against a surface M of the front panel 124.

In this way, it is convenient for the user to apply force to pull the fluid driving unit 120 out of the housing 110 or push the fluid driving unit 120 into the housing 110 in the sliding direction (i.e., the Y-axis direction). Meanwhile, since the handle assembly 130 includes the holding element 150 in this embodiment, the overall force arm is lengthened, and the fluid driving unit 120 may be pushed or pulled with less force, thereby reducing the user's labor burden.

Next, as illustrated in FIG. 4B, when the fluid driving unit 120 is in the free state S1' and at least a part of the fluid driving unit 120 enters the housing 110, the user may not be able to push the fluid driving unit 120 completely into the housing 110 easily due to the resistance from the structure of the first connecting portion 160 itself and water pressure from the circulation flow path. At this point, the user may continue to apply force so that the holding element 150 drives the connecting element 140 to rotate about the pivot AX as the center of rotation (i.e., in the clockwise direction of FIG. 4B), and the hook 142 will depart from the surface M and then abut against the protruding portion 116 of the force-receiving portion 114.

After the hook 142 abuts against the protruding portion 116, the user may apply force in the sliding direction, and the holding element 150 is adapted to drive the connecting element 140 to further rotate, so that the second end E2 slides relative to the force-receiving portion 114 toward the bottom portion 112 of the housing 110, so as to push the fluid driving unit 120 entirely into the housing 110 and result in the fixing state S2 as illustrated in FIG. 4C.

Through the above-mentioned design, the user only needs to apply, for example, a force of 14.3 kilograms to the holding element 150 to overcome the resistance of, for example, 93.9 kilograms, from the first connecting portion 160 (FIG. 2A), allowing the fluid driving unit 120 to be assembled to the housing 110 with much less force, thereby reducing the user's labor burden.

In addition, when the fluid driving unit 120 is in the free state S1, the second end E2 of the connecting element 140 abuts against the surface M of the front panel 124 and does not overlap with the force-receiving portion 114 in the sliding direction (i.e., the Y-axis direction). In other words, the force-receiving portion 114 is outside the travel path of the second end E2, and the second end E2 and the hook 142 will not collide with the force-receiving portion 114 and cause any damage, so a smooth sliding process is ensured.

Figure 5:
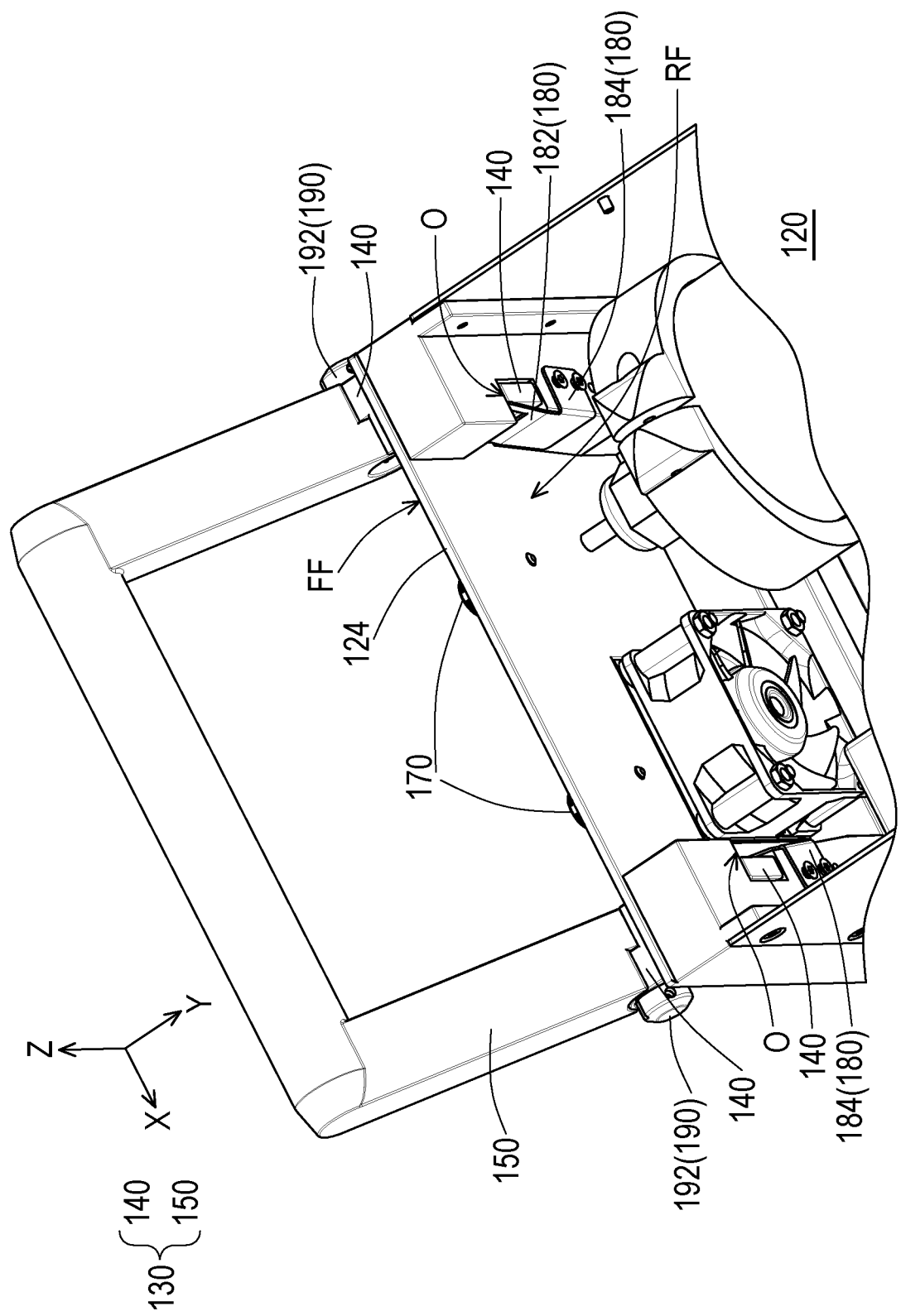
FIG. 5 is a schematic diagram of the fluid driving unit of FIG. 2B from another angle of view.
Figure 6A:
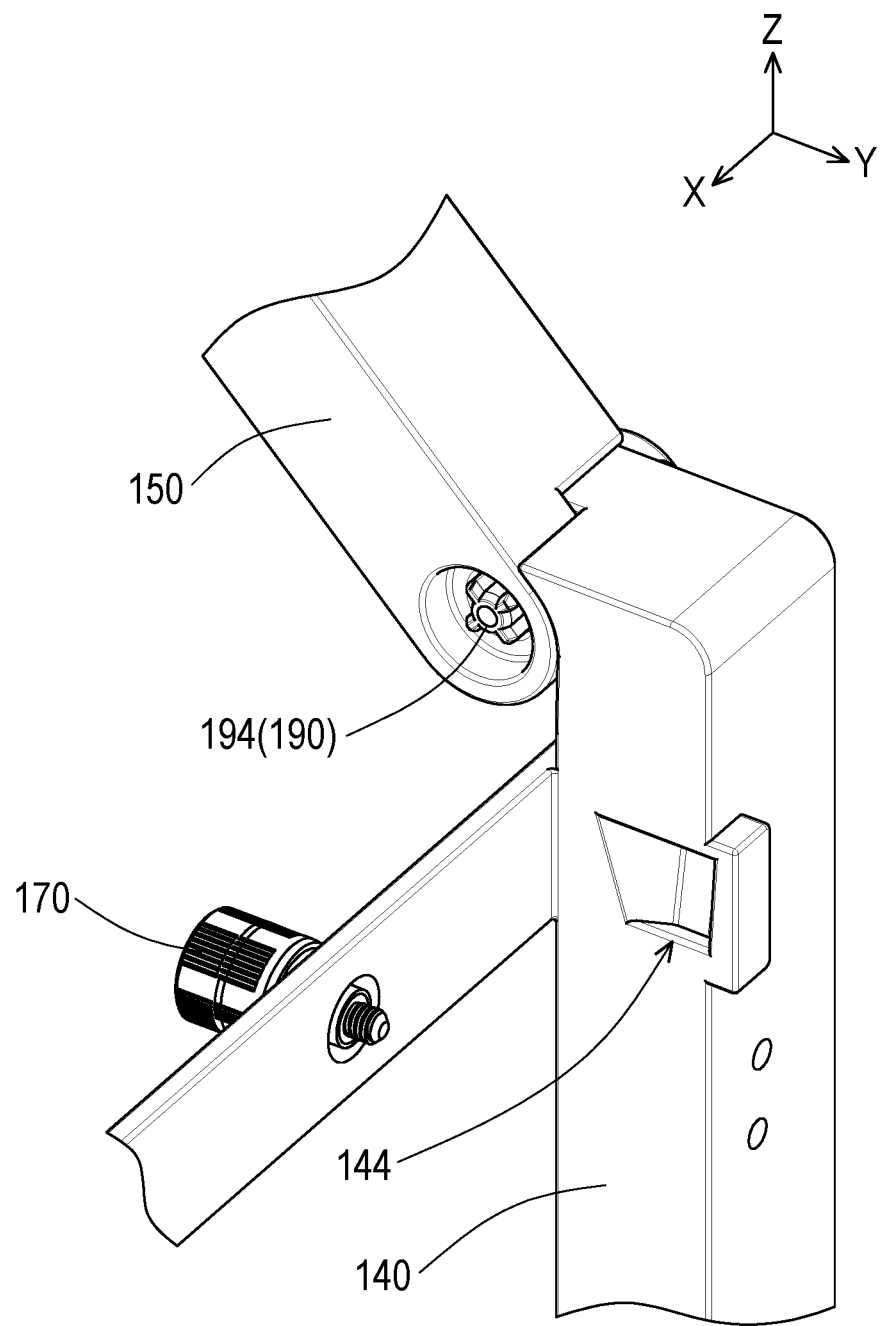
FIG. 6A is a partial enlarged view of a connecting element, a holding element, a hand screw, and a knob assembly of FIG. 5 from another angle of view.
Figure 6B:
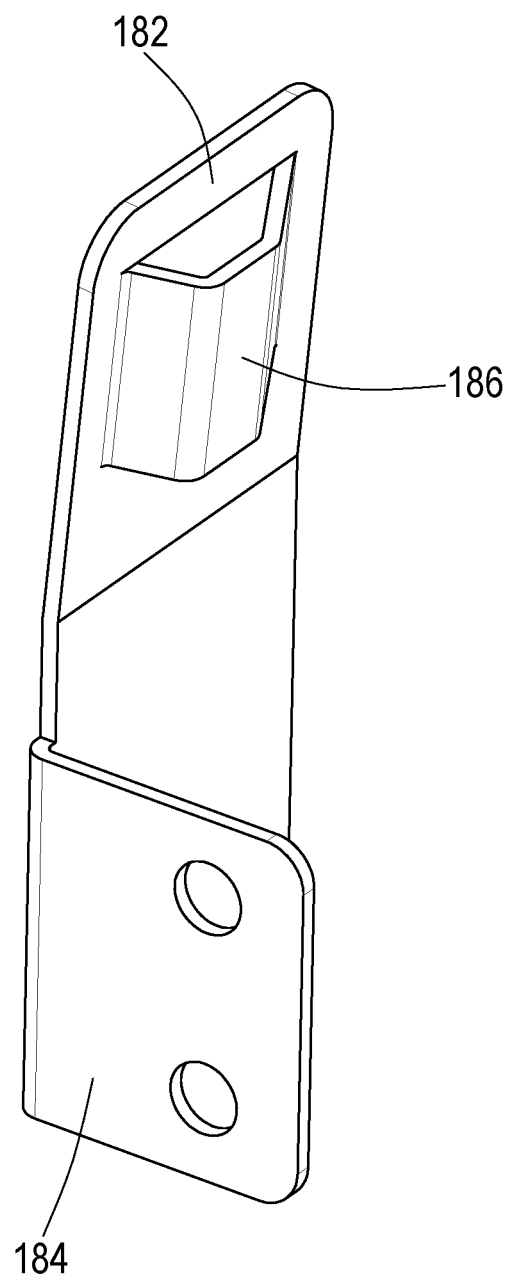
FIG. 6B is a schematic diagram of a spring piece of FIG. 5.

A locking design for the fluid driving unit 120 in the fixing state S2 will be explained as follows. FIG. 5 is a schematic diagram of the fluid driving unit of FIG. 2B from another angle of view. FIG. 6A is a partial enlarged view of a connecting element, a holding element, a hand screw, and a knob assembly of FIG. 5 from another angle of view. FIG. 6B is a schematic diagram of a spring piece of FIG. 5. To clearly illustrate the inside of the fluid driving unit 120, the cover 128 is hidden in FIG. 6B.

Referring to FIG. 5, FIG. 6B and FIG. 3, the front panel 124 in this embodiment has a front surface FF and a rear surface RF opposite to each other. The front surface FF is provided with a receiving groove 126 (FIG. 3). The fluid distribution module 10 further includes two spring pieces 180. The two spring pieces 180 are respectively disposed on two sides of the rear surface RF of the front panel 124 and are exposed by an opening O on each of the two sides of the rear surface RF, wherein the opening O is connected to the receiving groove 126 (FIG. 3).

The spring piece 180 has a fixing section 184, an elastic section 182 and a stopping portion 186 (FIG. 6B). The fixing section 184 is connected to the elastic section 182 and is fixed to the rear surface RF. The stopping portion 186 is disposed on the elastic section 182. The elastic section 182 may store elastic energy.

As illustrated in FIG. 5 and FIG. 6A, the connecting element 140 includes two engaging grooves 144 (FIG. 6A). The two engaging grooves 144 are respectively located on two opposite sides of the connecting element 140 and correspond to the two spring pieces 180. When the fluid driving unit 120 is completely pushed into the housing 110, the connecting element 140 may be received in the receiving groove 126 (FIG. 3). At this time, the two engaging grooves 144 are respectively engaged with the two spring pieces 180 to fix the fluid driving unit 120 to the housing 110.

More specifically, referring to FIG. 5 to FIG. 6B, when the connecting element 140 enters the receiving groove 126, the connecting element 140 pushes against the stopping portion 186 (FIG. 6B) of the spring piece 180 to move inward in the X-axis direction, so that the engaging groove 144 (FIG. 6A) enters the receiving groove 126 smoothly. At the moment, the engaging groove 144 is aligned with the stopping portion 186 of the spring piece 180, and the stopping portion 186 recovers and engages with the engaging groove 144 again due to the elastic force of the elastic section 182 (FIG. 6B).

In this way, the fluid driving unit 120 is able to smoothly switch from the free state S1 to the fixing state S2. At the moment, the stopping portion 186 stops the connecting element 140 in the sliding direction (the Y-axis direction), which prevents the connecting element 140 from departing from the receiving groove 126 due to the resistance from the first connecting portion 160. In other words, after the engaging groove 144 is engaged with the stopping portion 186 of the elastic section 182, the connecting element 140 may be fixed and not rotated in the position as illustrated in FIG. 4C, preventing the fluid driving unit 120 from exiting the housing 110.

In addition, as illustrated in FIG. 5, the fluid distribution module 10 further includes at least one hand screw 170 (two hand screws 170 are schematically shown in the drawing). The hand screw 170 is disposed on the connecting element 140. When the connecting element 140 is received in the receiving groove 126, that is, when the fluid driving unit 120 is in the fixing state S2, the connecting element 140 is adapted to be locked to the front panel 124 through the hand screw 170, so that the fluid driving unit 120 is fixed to the housing 110 more securely.

When the fluid driving unit 120 needs to be replaced, the user only needs to loosen the hand screw 170 first, and then pull the holding element 150 in the sliding direction (the Y-axis direction). The holding element 150 will drive the connecting element 140 to push against the stopping portion 186 (FIG. 6B) of the spring piece 180 to move in the negative X-axis direction, allowing the engaging groove 144 to disengage from the stopping portion 186 of the elastic section 182.

Once the engaging groove 144 is away from the elastic section 182, the fluid driving unit 120 is switched from the fixing state S2 to the free state S1. The connecting element 140 may be rotated again about the pivot AX as the center of rotation, shown in FIG. 4A or FIG. 4B, so that the fluid driving unit 120 may slide relative to the housing 110. Through the above-mentioned design, the user is able to quickly remove and replace the fluid driving unit 120 with a simple and labor-saving process, achieving timely maintenance for the fluid driving unit 120.

Figure 7:
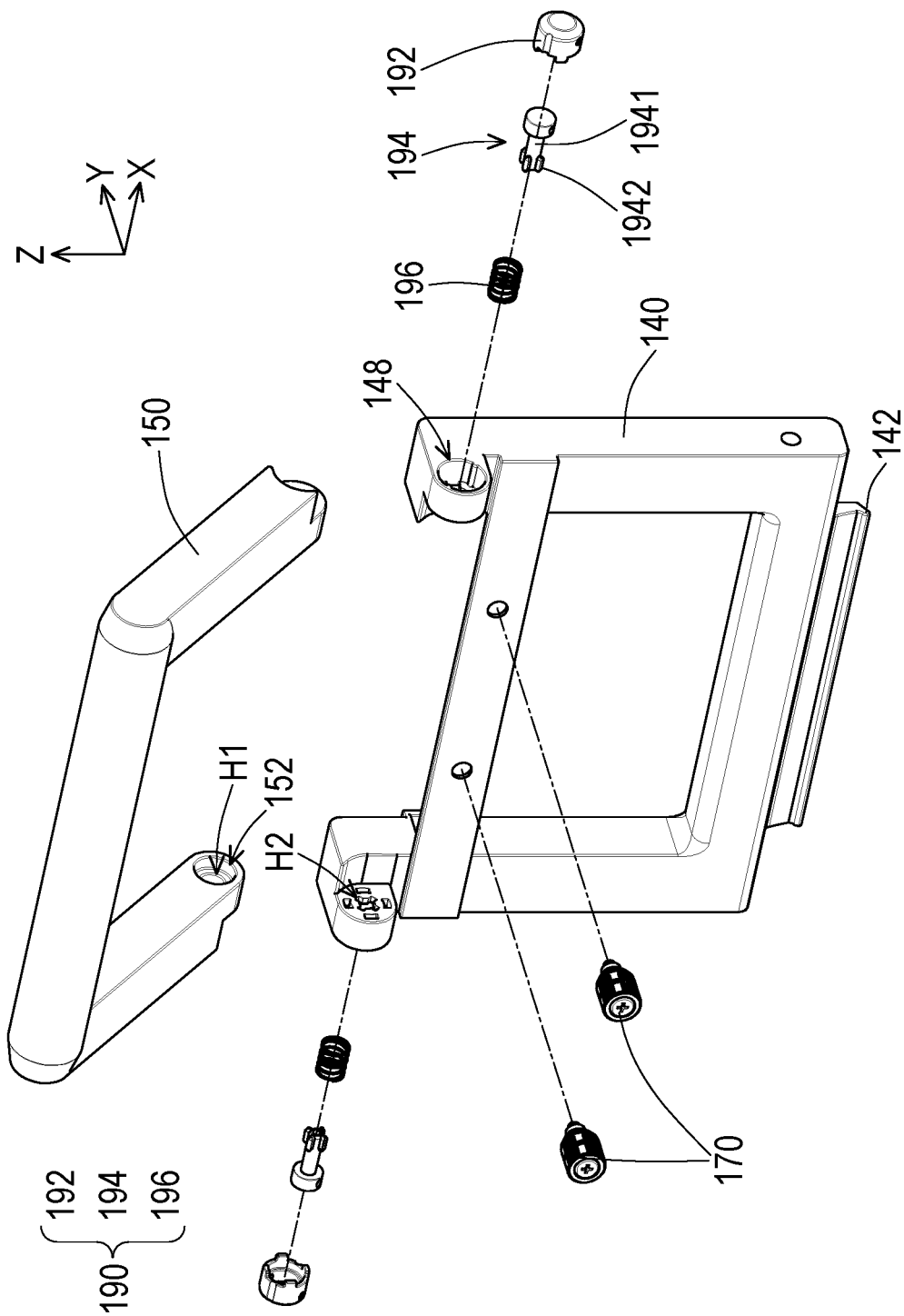
FIG. 7 is an exploded view of the connecting element, the holding element, the hand screw, and the knob assembly of FIG. 1.
Figure 8:
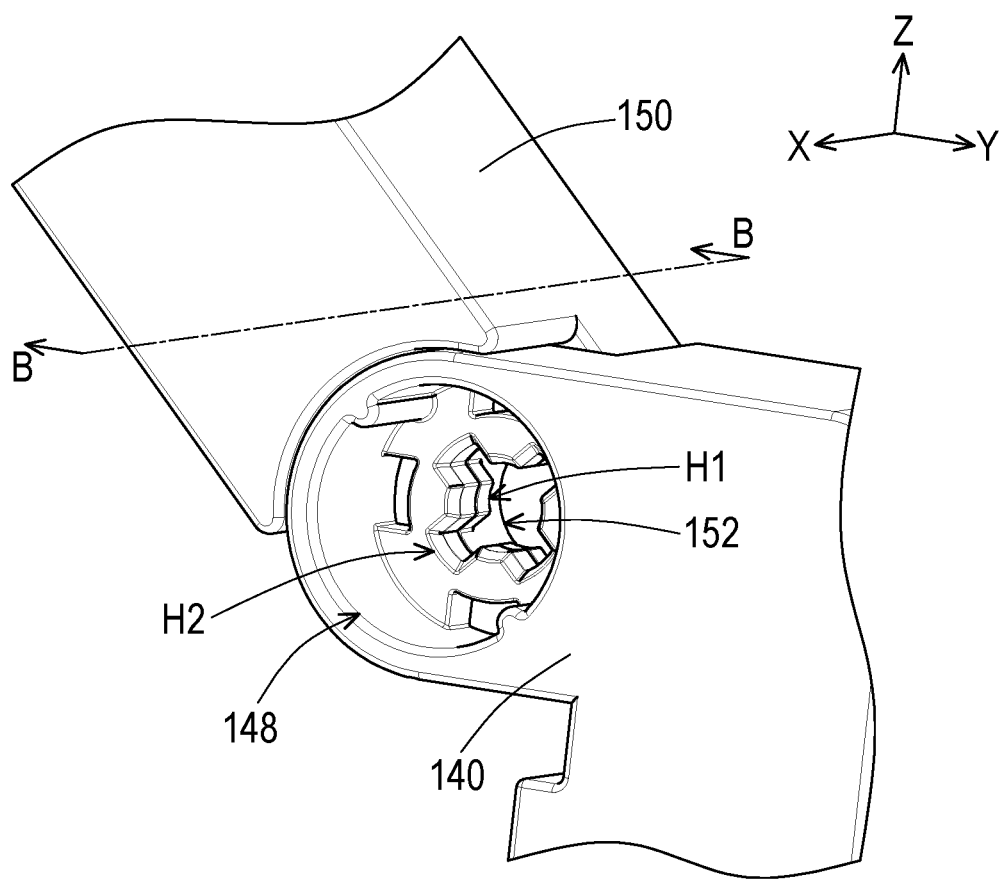
FIG. 8 is a partial enlarged view of the connecting element and the holding element of FIG. 1 from another angle of view.
Figure 9A:
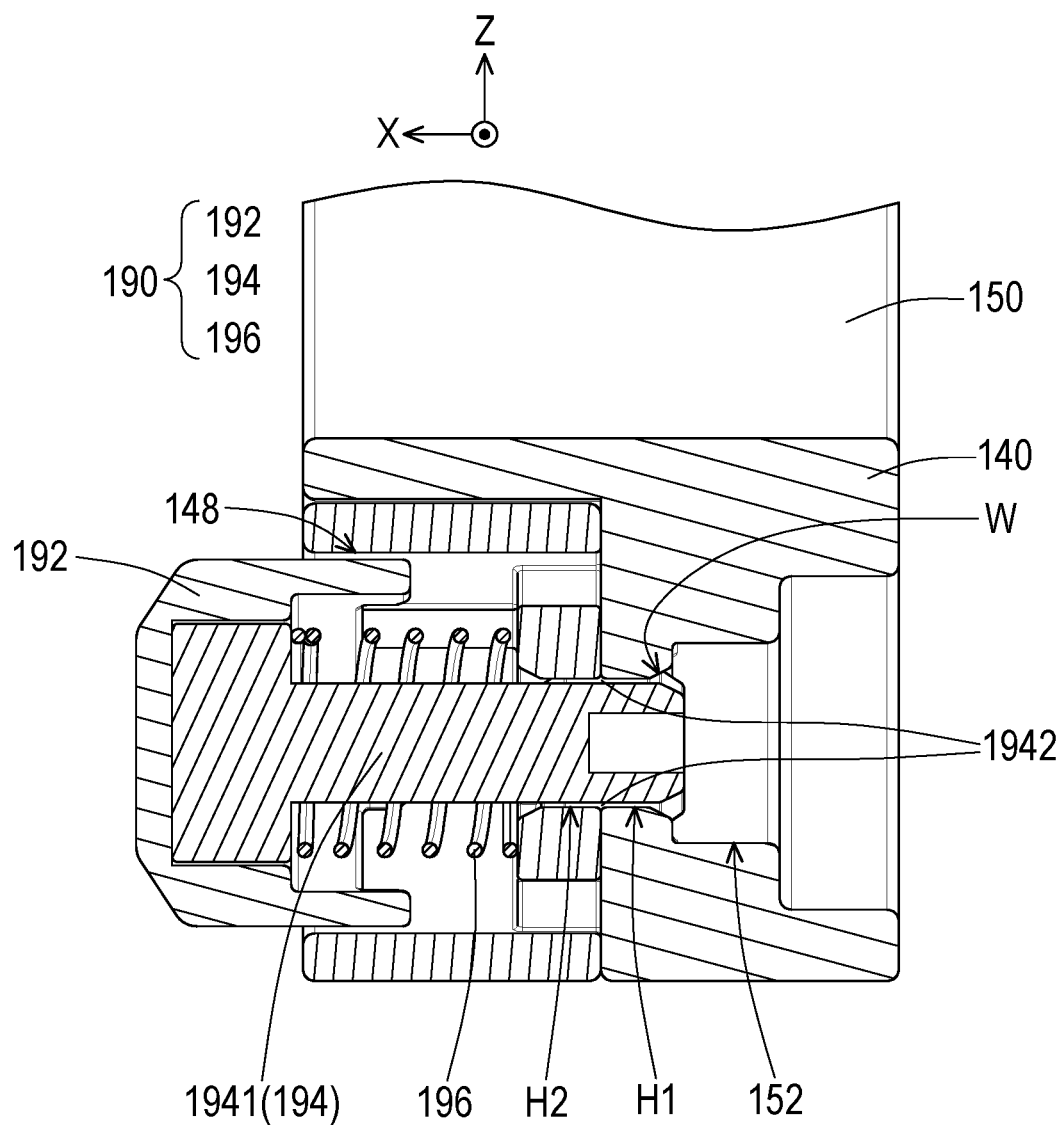
FIG. 9A is a partial cross-sectional view of the fluid distribution module of FIG. 1 along line B-B.
Figure 9B:
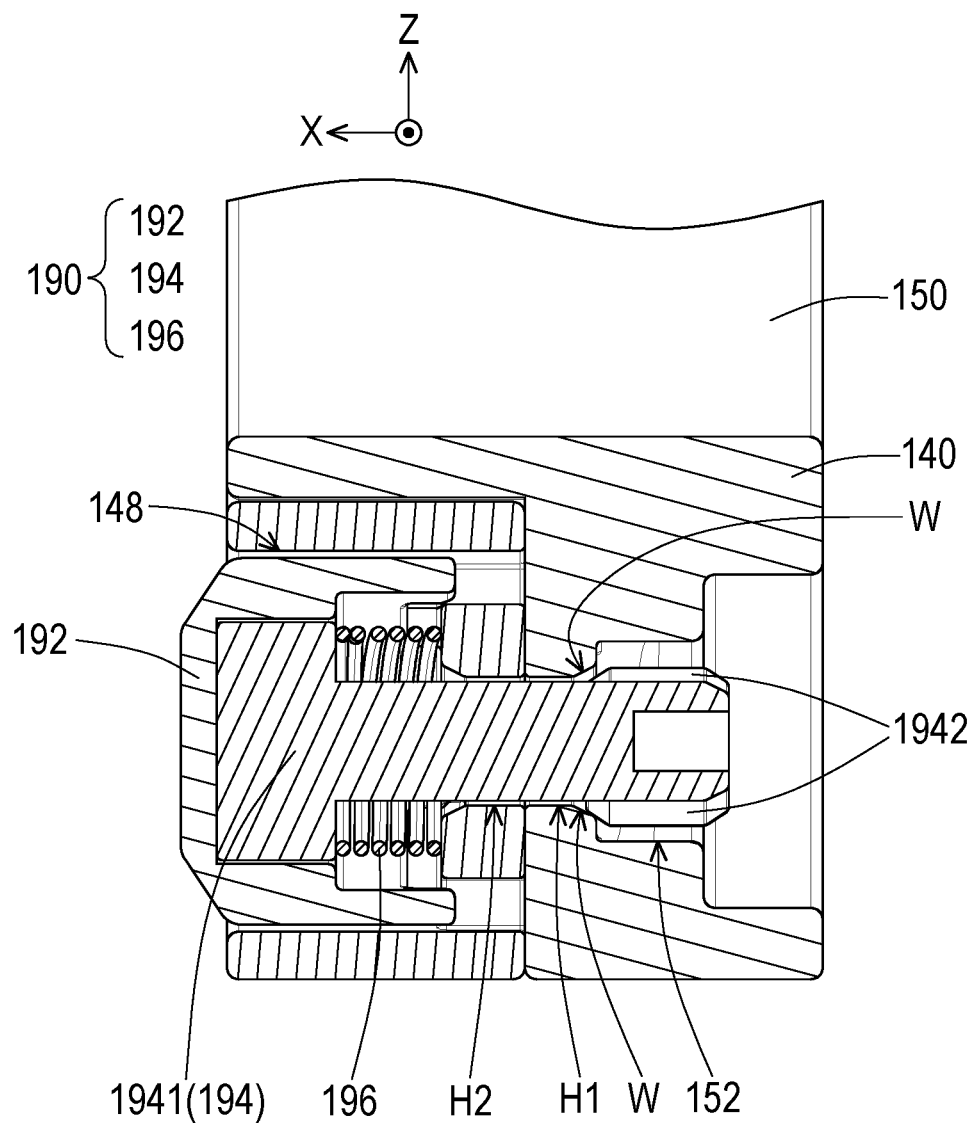
FIG. 9B is a partial cross-sectional view of FIG. 9A along line B-B when a pressing element is pressed.
Figure 10:
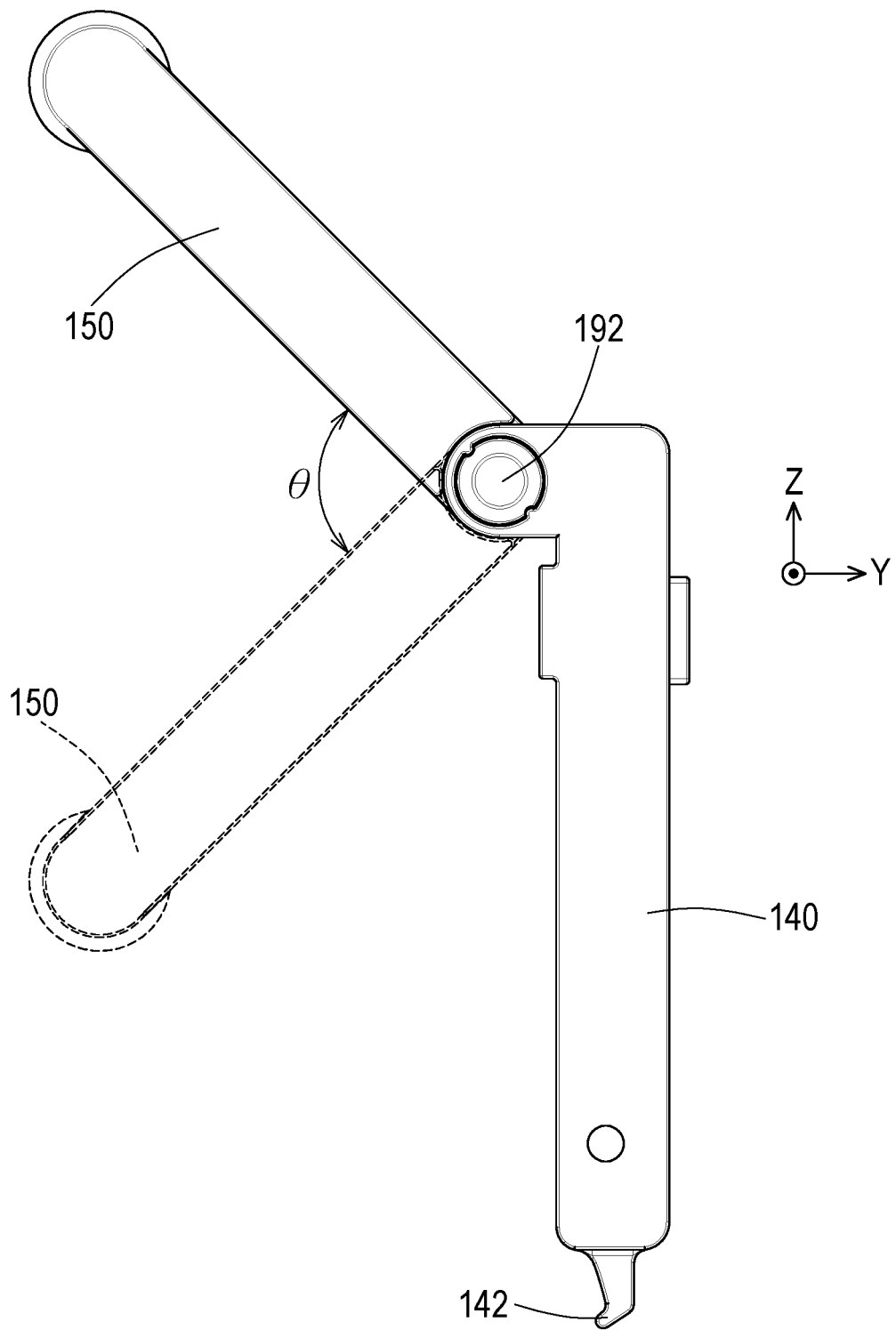
FIG. 10 schematically illustrates the connecting element, the holding element, and the knob assembly of FIG. 1 between different states.

The following will illustrate the pivotal connection of the holding element 150 to the connecting element 140. FIG. 7 is an exploded view of the connecting element, the holding element, the hand screw, and the knob assembly of FIG. 1. FIG. 8 is a partial enlarged view of the connecting element and the holding element of FIG. 1 from another angle of view. FIG. 9A is a partial cross-sectional view of the fluid distribution module of FIG. 1 along line B-B. FIG. 9B is a partial cross-sectional view of FIG. 9A along line B-B when a pressing element is pressed. FIG. 10 schematically illustrates the connecting element, the holding element, and the knob assembly of FIG. 1 between different states. Note that the holding element 150 after rotation is drawn with dotted line in FIG. 10.

Referring to FIG. 7 and FIG. 8, the connecting element 140 in this embodiment has at least one recess 148 (two recesses 148 are schematically shown in the drawings), and the holding element 150 has a groove 152 corresponding to the recess 148. The handle assembly 130 further includes at least one knob assembly 190 (two knob assemblies 190 are schematically shown). The knob assembly 190 is provided in the recess 148, and the holding element 150 is pivotally connected to the connecting element 140 through the knob assembly 190.

Referring to FIG. 9A and FIG. 9B, specifically, the knob assembly 190 includes a pressing element 192, a positioning element 194 and an elastic element 196. The positioning element 194 includes a positioning body 1941 and a positioning protrusion 1942. The pressing element 192 protrudes out of the connecting element 140 and is connected to the positioning body 1941. The positioning body 1941 has a positioning protrusion 1942 at one end away from the pressing element 192. The elastic element 196 is arranged in the recess 148 and is located between the pressing element 192 and the positioning protrusion 1942.

Further, the holding element 150 has a first positioning groove H1, and the first positioning groove H1 is located in the groove 152. The connecting element 140 has a second positioning groove H2, and the second positioning groove H2 is located in the recess 148. The second positioning groove H2 is aligned with the first positioning groove H1. As illustrated in FIG. 9A, the positioning protrusion 1942 is positioned in the first positioning groove H1 and the second positioning groove H2. Therefore, the first positioning groove H1 cannot rotate relative to the second positioning groove H2, that is, the holding element 150 does not rotate relative to the connecting element 140.

As illustrated in FIG. 9B, the pressing element 192 is adapted to be pressed to resist the elastic force of the elastic element 196, thereby pushing the positioning protrusion 1942 of the positioning element 194 away from the second positioning groove H2 and the first positioning groove H1 and into the groove 152. At this point, the elastic element 196 is compressed to store elastic energy.

Next, the holding element 150 is adapted to be rotated relative to the connecting element 140 about the positioning element 194 as an axis of rotation, so that the positioning protrusion 1942 is misaligned with the first positioning groove H1 and is stopped by a wall surface W of the holding element 150. When the holding element 150 is rotated by a preset angle θ relative to the connecting element 140 as illustrated in FIG. 10 (e.g., the position of the holding element 150 shown by the dotted lines), the positioning protrusion 1942 is aligned with the first positioning groove H1 again. Then the elastic element 196 is no longer compressed and the elastic energy is released, thereby pushing the positioning body 1941 to move in a direction (i.e., the X-axis direction) away from the groove 152. Consequentially, the positioning protrusion 1942 retracts into the first positioning groove H1 and the second positioning groove H2 (FIG. 9B) by the elastic force of the elastic element 196, so as to fix the holding element 150 to the connecting element 140 again, as illustrated in FIG. 9A.

The holding element 150 in this embodiment may be pivotally rotated relative to the connecting element 140 through the knob assembly 190, which is conducive for storage and space saving purposes. When the holding element 150 is rotated by the preset angle θ, the holding element 150 is automatically fixed to the connecting element 140, preventing the holding element 150 from waving unexpectedly. In addition, the preset angle θ in this embodiment is, for example, 90 degrees, but the preset angle θ is not limited thereto and may depend on design requirements.

Figure 11:
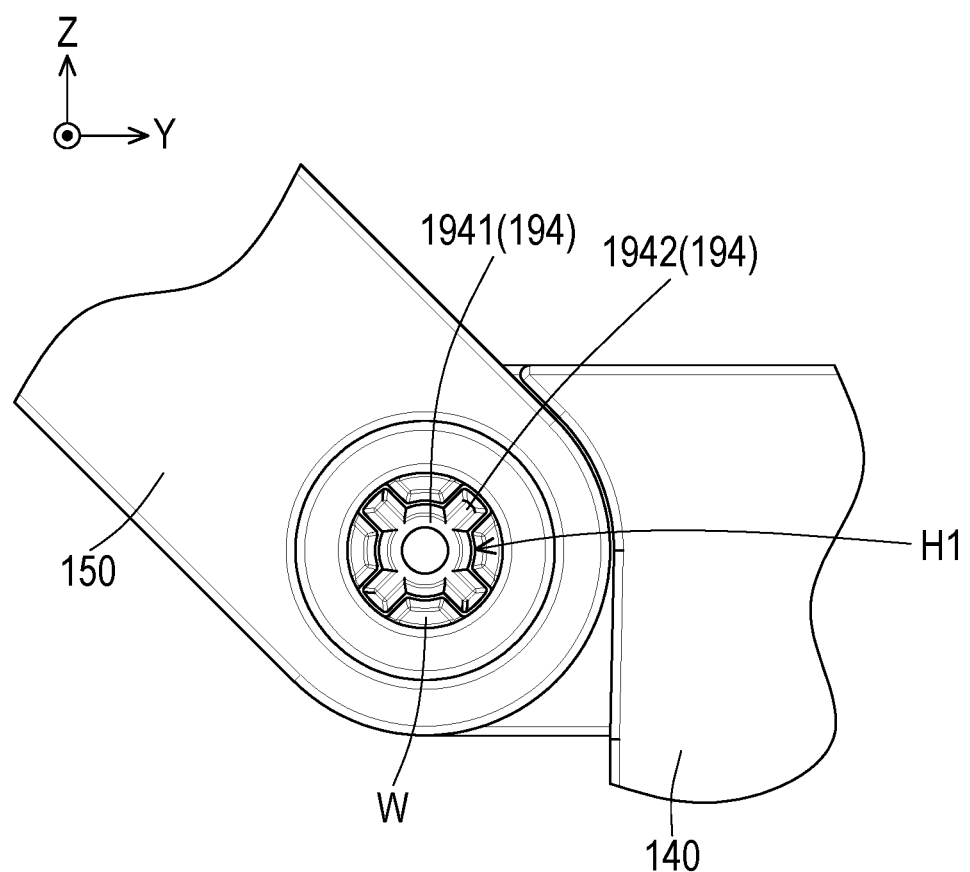
FIG. 11 is a partial side view of the connecting element, the holding element, and the knob assembly of FIG. 1.

FIG. 11 is a partial side view of the connecting element, the holding element, and the knob assembly of FIG. 1. Referring to FIG. 11 and FIG. 8, the first positioning groove H1 and the second positioning groove H2 in this embodiment are, for example, cross-shaped or approximately cross-shaped. The combined shape of the positioning body 1941 and the positioning protrusion 1942 corresponds to the shape of the first positioning groove H1 and the shape of the second positioning groove H2, so as to appropriately position the positioning element 194 in the first positioning groove H1 and the second positioning groove H2, but the shape of the first positioning groove H1 and the shape of the second positioning groove H2 are not limited thereto.

In summary, in the fluid distribution module of the disclosure, the handle assembly includes the connecting element and the holding element. The connecting element is pivotally connected to the fluid driving unit, the holding element is pivotally connected to the connecting element, and the holding element is adapted to drive the fluid driving unit by force to switch between the free state and the fixing state. When the fluid driving unit is in the free state, the fluid driving unit may slide relative to the housing, and thus the user is able to easily remove and replace the fluid driving unit, thereby achieving timely replacement and repair for the fluid driving unit. When the fluid driving unit is in the fixing state, the fluid driving unit is fixed in the housing, and the second connecting portion is docked with the first connecting portion. Meanwhile, the coolant may enter and leave the fluid driving unit for the normal operation of the fluid distribution module. In addition, since the holding element of the handle assembly provides a longer force arm, the user is able to push or pull the fluid driving unit with less force, making the replacement or assembly of the fluid driving unit very labor-saving.

Further, the fluid distribution module ensures that the fluid driving unit to be securely fixed in the housing in the fixing state through the cooperation of the spring pieces, the engaging grooves and the hand screws, and does not accidentally get pushed out of the housing due to the resistance of the first connecting portion. In addition, the fluid distribution module also includes the knob assembly. The holding element may be pivotally rotated and fixed relative to the connecting element through the knob assembly, which is conducive for storage and space saving purposes.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A fluid distribution module, comprising:
a housing;
a first connecting portion, disposed in the housing;
at least one fluid driving unit, adapted to be arranged in the housing and comprising a second connecting portion; and
at least one handle assembly, pivotally connected to the at least one fluid driving unit and adapted to drive the at least one fluid driving unit by force to switch between a free state and a fixing state,
when the at least one fluid driving unit is in the free state, the at least one handle assembly is adapted to drive the at least one fluid driving unit to slide relative to the housing,
when the at least one fluid driving unit is in the fixing state, the at least one fluid driving unit is fixed in the housing so that the second connecting portion is docked with the first connecting portion,
wherein the at least one handle assembly comprises a connecting element and a holding element, the connecting element is pivotally connected to the at least one fluid driving unit, and the holding element is pivotally connected to the connecting element.

2. The fluid distribution module according to claim 1, wherein the second connecting portion comprises two second connecting ends, the first connecting portion comprises at least two first connecting ends, and when the at least one fluid driving unit is in the fixing state, the two second connecting ends are respectively connected to the at least two first connecting ends.

3. The fluid distribution module according to claim 1, wherein the connecting element comprises a first end and a second end opposite to each other, the first end is pivotally connected to the holding element, the second end has a hook, and the hook corresponds to a force-receiving portion of the housing.

4. The fluid distribution module according to claim 3, wherein the connecting element is pivotally connected to the at least one fluid driving unit through a pivot, and the pivot is adjacent to the second end and is distant from the first end.

5. The fluid distribution module according to claim 3, wherein when the at least one fluid driving unit is in the free state, the second end is adapted to abut against the at least one fluid driving unit.

6. The fluid distribution module according to claim 3, wherein when at least a part of the at least one fluid driving unit enters the housing, the holding element is adapted to drive the connecting element to rotate so that the hook abuts against the force-receiving portion, the holding element is adapted to drive the connecting element to further rotate, so as to slide the second end relative to the force-receiving portion to push the at least one fluid driving unit entirely into the housing.

7. The fluid distribution module according to claim 6, wherein when the at least one fluid driving unit is in the free state, the connecting element does not overlap with the force-receiving portion in a sliding direction.

8. The fluid distribution module according to claim 1, wherein the at least one fluid driving unit further comprises a front panel, the connecting element is pivotally connected to the front panel, and the front panel has a receiving groove.

9. The fluid distribution module according to claim 8, wherein when the at least one fluid driving unit is in the fixing state, the connecting element is received in the receiving groove.

10. The fluid distribution module according to claim 9, further comprising at least one hand screw, wherein the at least one hand screw is disposed on the connecting element, and when the connecting element is received in the receiving groove, the connecting element is adapted to be locked to the front panel through the at least one hand screw.

11. The fluid distribution module according to claim 9, further comprising two spring pieces, wherein the two spring pieces are respectively disposed on two sides of the front panel, the connecting element comprises two engaging grooves, and the two engaging grooves are adapted to respectively engage with the two spring pieces, so as to fix the at least one fluid driving unit to the housing.

12. The fluid distribution module according to claim 11, wherein each of the two spring pieces has a fixing section and an elastic section, the fixing section is fixed on the front panel, and the corresponding engaging groove is engaged with the elastic section.

13. The fluid distribution module according to claim 12, wherein the holding element is adapted to drive the corresponding engaging groove of the connecting element to disengage from the elastic section, so that the at least one fluid driving unit is switched from the fixing state to the free state.

14. The fluid distribution module according to claim 1, wherein the at least one handle assembly further comprises at least one knob assembly, the connecting element has at least one recess, the at least one knob assembly is disposed in the at least one recess, and the holding element is pivotally connected to the connecting element through the at least one knob assembly.

15. The fluid distribution module according to claim 14, wherein the at least one knob assembly comprises a pressing element, a positioning element and an elastic element, the pressing element protrudes out of the connecting element and is connected to the positioning element, the positioning element has a positioning protrusion at one end away from the pressing element, and the elastic element is arranged between the pressing element and the positioning protrusion.

16. The fluid distribution module according to claim 15, wherein the holding element has a first positioning groove, the connecting element has a second positioning groove, the second positioning groove is located in the at least one recess and is aligned with the first positioning groove, and the positioning protrusion is positioned in the first the positioning groove and in the second positioning groove.

17. The fluid distribution module according to claim 16, wherein the pressing element is adapted to be pressed to resist an elastic force of the elastic element to move the positioning protrusion out of the second positioning groove and the first positioning groove, and then the holding element is adapted to be rotated about the positioning element as an axis of rotation relative to the connecting element rotates so that the positioning protrusion is misaligned with the first positioning groove and is stopped by a wall surface of the holding element.

18. The fluid distribution module according to claim 17, wherein when the holding element is rotated by a preset angle relative to the connecting element, the positioning protrusion is aligned with the first positioning groove, and the positioning protrusion retracts into the first positioning groove and the second positioning groove by the elastic force of the elastic element.

19. The fluid distribution module according to claim 16, wherein the first positioning groove and the second positioning groove are cross-shaped.

20. The fluid distribution module according to claim 1, wherein the at least one fluid driving unit comprises two fluid driving units, the at least one handle assembly comprises two handle assemblies, and the two handle assemblies are pivotally connected to the two fluid driving units, respectively.

* * * * *